United States Patent [19]

Ikazaki et al.

[11] Patent Number: 5,695,734
[45] Date of Patent: Dec. 9, 1997

[54] PROCESS FOR THE SEPARATION OF CARBON NANOTUBES FROM GRAPHITE

[75] Inventors: Fumikazu Ikazaki; Kunio Uchida; Motoo Yumura, all of Tsukuba; Satoshi Ohshima, Abiko; Yasunori Kuriki, Tsukuba; Hiroshi Hayakawa, Tsuchiura, all of Japan

[73] Assignee: Director-General of Agency of Industrial Science & Technology, Japan

[21] Appl. No.: 529,067

[22] Filed: Sep. 15, 1995

[30] Foreign Application Priority Data

Sep. 27, 1994 [JP] Japan .................. 6-231222

[51] Int. Cl.$^6$ .................. D01F 9/12; C01B 31/02
[52] U.S. Cl. .................. 423/461; 423/447.1; 423/445 B
[58] Field of Search .................. 423/445 B, 460, 423/461, 447.1, 447.6

[56] References Cited

U.S. PATENT DOCUMENTS 5,346,683  9/1994  Green et al. .................. 423/445 B
5,560,898  10/1996  Uchida .................. 423/461

OTHER PUBLICATIONS

Nature, vol. 367, 10 Feb. 1994, p. 519, "Purification of Nanotubes".
Ikazaki, F., et al. "Chemical Purification of Carbon Nanotubes by Use of Graphite Intercalation Compounds", Carbon, vol. 32 #8, pp. 1539–1542 (Dec. 1994).

*Primary Examiner*—Steven Bos
*Assistant Examiner*—Peter T. DiMauro
*Attorney, Agent, or Firm*—Lorusso & Loud

[57] ABSTRACT

A process for the isolation of carbon nanotubes from a mixture containing carbon nanotubes and graphite is disclosed, which includes the steps of:

(a) reacting the mixture with a metal compound to intercalate the metal compound into the graphite;

(b) reducing the reaction mixture obtained in step (a) to convert the intercalated metal compound to elemental metal;

(c) heating the reduction mixture obtained in step (b) at a temperature of 450–600° C. in an oxygen-containing atmosphere to selectively oxidize the graphite and the elemental metal; and (d) contacting the heated mixture obtained in step (c) with a liquid to dissolve the oxidized metal in the liquid and to separate the carbon nanotubes as a solid phase from the oxidized metal.

16 Claims, No Drawings

PROCESS FOR THE SEPARATION OF CARBON NANOTUBES FROM GRAPHITE

BACKGROUND OF THE INVENTION

This invention relates to a process for the isolation of carbon nanotubes from a mixture containing carbon nanotubes and graphite particles.

Carbon nanotubes are recently discovered, hollow graphite tubules having a diameter of generally several to several tens nanometers. One method for the preparation of carbon nanotubes is disclosed by Ebbesen et al (Nature, 358, 220 (1992)). The crude product obtained by this method contains a large amount of graphite and a small amount of carbon nanotubes. It is thus necessary to separate carbon nanotubes from the graphite.

Ebbesen et al suggest a carbon nanotube separation method in which the crude product is heated at a temperature of 750° C. in an oxidizing atmosphere to selectively burn the graphite and amorphous carbon (Nature, 367, 519 (1994)). Since the amount of the graphite is very large and the difference in oxidizing temperature between the graphite and carbon nanotubes is very small, the known method has a problem in the yield of the carbon nanotubes.

In U.S. Ser. No. 08/283,508, now U.S. Pat. No. 5,560,898 Uchida et al propose a carbon nanotube isolation method in which a mixture containing carbon nanotubes and graphite particles is pulverized, dispersed in a liquid and centrifuged to obtain a precipitate rich in graphite particles and a supernatant containing carbon nanotubes and fine graphite particles. The supernatant is then separated into a solid phase and a liquid phase, and the solid phase is heated in an oxygen-containing atmosphere to selectively burn the graphite particles. This method can separate the carbon nanotubes with an improved yield but requires complicated steps.

SUMMARY OF THE INVENTION

The present invention provides a process for the isolation of carbon nanotubes from a mixture containing carbon nanotubes and graphite, which includes the following steps (a)-(d):

(a) the mixture is reacted with a metal compound to intercalate the metal compound into the graphite, thereby to obtain a reaction mixture containing the carbon nanotubes and the graphite into which the metal compound has been intercalated;

(b) the reaction mixture is reduced to convert the intercalated metal compound to elemental metal, thereby to obtain a reduction mixture containing the carbon nanotubes and the graphite carrying the elemental metal;

(c) the reduction mixture is heated at a temperature of 450°–600° C. in an oxygen-containing atmosphere to selectively oxidize the graphite into $CO_2$ and the elemental metal into a metal oxide, thereby to obtain a heated mixture containing the carbon nanotubes and the metal oxide; and (d) the heated mixture is contacted with a liquid to dissolve the metal oxide, thereby to separate the carbon nanotubes as a solid phase.

It is the prime object of the present invention to provide a method which can obtain carbon nanotubes with a high purity.

Another object of the present invention is to provide a method which can separate carbon nanotubes from raw material containing graphite and carbon nanotubes at a relatively low temperature.

Other objects, features and advantages of the present invention will become apparent from the detailed description of the invention to follow.

DETAILED DESCRIPTION OF THE PREFERRED EMBODIMENTS OF THE INVENTION

In the present invention, a mixture containing carbon nanotubes and graphite is used as a raw material. Such a raw material mixture may be suitably obtained by the method disclosed in the above Ebbesen et al article or by the method disclosed in U.S. Ser. No. 08/372,130 filed Jan. 13, 1995 (Ohshima et al) now U.S. Pat. No. 5,482,601. Generally, the content of the carbon nanotubes in the raw material mixture is at most about 5% by weight. However, the process of the present invention is effective for a raw material mixture having a carbon nanotube content of much more than 5%, for example, 50% by weight.

The raw material mixture is first reacted with a metal compound to intercalate the metal compound between layers of the graphite. The metal compound is preferably a halide. The metal of the metal compound may be, for example, copper, titanium, vanadium, chromium, zinc, molybdenum, tungsten or rhenium. Above all, the use of cupric chloride, or molybdenum chloride is preferred. The intercalation may be performed by heating a blend of the raw material mixture at a temperature of 350°–600° C. in the oxygen-free atmosphere such as under vacuum or in the atmosphere of an inert gas such as nitrogen, argon or helium for a period of time sufficient to effect the intercalation.

It is preferred that the intercalation be carried out in the presence of KCl which serves to lower the fusing point of the reaction mixture. The amount of KCl is generally 0.1–1 part by weight per part by weight of the metal compound. The amount of the metal compound is generally 1–20 parts, preferably 2–10 parts by weight, per part by weight of the raw material mixture containing carbon nanotubes and graphite.

The reaction mixture containing the carbon nanotubes and graphite into which the metal compound has been intercalated is preferably washed with deionized water to remove KCl and unreacted metal compound and is then subjected to a reduction treatment to convert the intercalated metal compound into elemental metal. The reduction treatment may be carried out in a liquid phase by, for example, treating with a reducing agent such as metallic lithium or metallic sodium, in a liquid medium such as a tetrahydrofuran containing naphthalene, or in a gas phase by, for example, treating with a reducing gas such as hydrogen at an elevated temperature of 450°–600° C.

The product obtained by the reduction treatment and containing the carbon nanotubes and the elemental metal-carrying graphite is then oxidized at a temperature of 450°–600° C., preferably 500°–550° C., in an oxidizing atmosphere such as air to selectively burn the graphite. Because of the inclusion of the elemental metal, the graphite may be burnt at a temperature lower than the metal-free graphite, so that the decomposition of the carbon nanotubes may be avoided. By the oxidation treatment, the graphite is converted into carbon dioxide while the elemental metal is converted into the metal oxide.

The product obtained by the above oxidation and containing the carbon nanotubes and metal oxide is treated with a liquid such as an aqueous acid, e.g. hydrochloric acid or nitric acid, to dissolve the metal oxide. By a solid-liquid separation such as by filtration, the carbon nanotubes may be isolated.

The raw material mixture to be treated according to the process of the present invention may additionally contain amorphous carbon. The amorphous carbon is easily decomposed during the oxidizing step and does not adversely affect the purification of carbon nanotubes.

The following examples will further illustrate the present invention.

EXAMPLE 1

Carbon nanotubes were prepared according to the method of Ebessen et al. Two graphite rods were disposed in a carbon cluster producing vessel maintained at a flowing helium pressure of 500 Torr. The anode graphite rod had a diameter of 8 mm. A DC voltage of 18 V was impressed between the two rods. The thus obtained crude carbon nanotube product (1 g) containing carbon nanotubes and graphite was mixed with 4.6 g of cupric chloride and 2.5 g of potassium chloride and the mixture was charged in a glass ampoule under vacuum. The ampoule was closed by fusion and maintained at 400° C. for 7 days so that the cupric chloride was intercalated into the graphite.

The product was then taken out of the ampoule and dispersed in a deionized water, followed by filtration and washing with deionized water. The intercalation product was then heated to 500° C. at a rate of 10° C./minute in the atmosphere of a mixed stream consisting of 50 ml/minute of helium and 50 ml/minute of hydrogen and maintained at that temperature for 1 hour under the same mixed stream so that the cupric chloride was converted into metallic copper.

The reduction product was then heated to 550° C. at a rate of 10° C./minute in air to burn the graphite and to convert metallic copper into cupric oxide. This was dispersed in hydrochloric acid to dissolve cupric oxide, followed by filtration and washing with hydrochloric acid and with water, thereby obtaining solids. The scanning electric microphotograph reveals that the solids are carbon nanotubes containing substantially no graphite.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A process for the isolation of carbon nanotubes from a mixture containing carbon nanotubes and graphite, comprising the steps of:

(a) reacting said mixture with a metal compound to intercalate said metal compound into said graphite;

(b) reducing said reaction mixture obtained in step (a) to convert said intercalated metal compound to elemental metal;

(c) heating said reduction mixture obtained in step (b) at a temperature of 450°–600° C. in an oxygen-containing atmosphere to selectively oxidize said graphite and said elemental metal; and (d) contacting said heated mixture obtained in step (c) with a liquid to dissolve said oxidized metal in said liquid and to separate said carbon nanotubes as a solid phase from said oxidized metal.

2. A process as claimed in claim 1, wherein said metal compound is a metal halide.

3. A process as claimed in claim 1, wherein said metal compound is a metal chloride.

4. A process as claimed in claim 1, wherein step (c) is performed at 500°–550° C.

5. A process as claimed in claim 1, wherein said liquid is an aqueous acid solution.

6. A process as claimed in claim 1 further comprising adding said metal compound and KCl to the mixture prior to step (a).

7. A process as claimed in claim 6 wherein the amount of said KCl added is 0.1–1 part by weight per part by weight of the metal compound.

8. A process as claimed in claim 7 wherein the amount of the metal compound is 1–20 parts by weight per part by weight of said mixture containing carbon nanotubes and graphite.

9. A process as claimed in claim 6 wherein the amount of the metal compound is 1–20 parts by weight per part by weight of said mixture containing carbon nanotubes and graphite.

10. A process as claimed in claim 1 wherein the amount of the metal compound is 1–20 parts by weight per part by weight of said mixture containing carbon nanotubes and graphite.

11. A process as claimed in claim 1 wherein said metal compound is selected from the group consisting of copper, titanium, vanadium, chromium, zinc, molybdenum, tungsten and rhenium.

12. A process as claimed in claim 6 wherein said metal compound is selected from the group consisting of copper, titanium, vanadium, chromium, zinc, molybdenum, tungsten and rhenium.

13. A process as defined in claim 11 wherein said metal compound is a halide.

14. A process as claimed in claim 12 wherein said metal compound is a halide.

15. A process as claimed in claim 11 wherein said metal compound is cupric chloride or molybdenum chloride.

16. A process as claimed in claim 12 wherein said metal compound is cupric chloride or molybdenum chloride.

* * * * *